(12) United States Patent
Fakoorian et al.

(10) Patent No.: US 11,616,595 B2
(45) Date of Patent: Mar. 28, 2023

(54) MULTI-CHANNEL LISTEN BEFORE TALK WITH WIDEBAND TRANSMISSION IN NEW RADIO IN UNLICENSED SPECTRUM

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/586,453

(22) Filed: Sep. 27, 2019

(65) Prior Publication Data

US 2020/0112389 A1    Apr. 9, 2020

Related U.S. Application Data

(60) Provisional application No. 62/743,368, filed on Oct. 9, 2018.

(51) Int. Cl.
*H04L 12/00*    (2006.01)
*H04L 1/00*    (2006.01)
(Continued)

(52) U.S. Cl.
CPC .......... *H04L 1/0013* (2013.01); *H04B 17/318* (2015.01); *H04L 5/0048* (2013.01);
(Continued)

(58) Field of Classification Search
None
See application file for complete search history.

(56) References Cited

U.S. PATENT DOCUMENTS

2017/0034817 A1\*    2/2017    Park ...................... H04L 5/0035
2019/0238270 A1\*    8/2019    Pan .................... H04W 74/0833
(Continued)

OTHER PUBLICATIONS

International Search Report and Written Opinion—PCT/US2019/053884—ISA/EPO—dated Mar. 10, 2020.
(Continued)

*Primary Examiner* — Noel R Beharry
*Assistant Examiner* — Lionel Preval
(74) *Attorney, Agent, or Firm* — Harrity & Harrity, LLP \ Qualcomm

(57) ABSTRACT

Various aspects of the present disclosure generally relate to wireless communication. In some aspects, a wireless communication device may perform rate matching of coded bits of each transport block, of a plurality of transport blocks, on a per-channel basis among a plurality of channels in a wideband channel of an unlicensed spectrum. The rate matching is performed on the per-channel basis in a first set of slots and such that coded bits of each transport block are mapped to a respective one of the plurality of channels. The wireless communication device may receive, after a transmission of the plurality of transport blocks on the plurality of channels, per-channel acknowledgment information. The wireless communication device may selectively adjust a plurality of contention windows, each associated with a listen before talk procedure to be performed on a respective one of the plurality of channels. Numerous other aspects are provided.

20 Claims, 13 Drawing Sheets

(51) Int. Cl.
  *H04L 5/00*    (2006.01)
  *H04B 17/318*  (2015.01)
  *H04W 74/08*   (2009.01)

(52) U.S. Cl.
  CPC .......... *H04L 5/0055* (2013.01); *H04L 5/0064* (2013.01); *H04W 74/0808* (2013.01)

(56) References Cited

U.S. PATENT DOCUMENTS

| | | | |
|---|---|---|---|
| 2019/0253200 A1* | 8/2019 | Salem | H04W 74/0808 |
| 2020/0287691 A1* | 9/2020 | Baldemair | H04L 1/18 |
| 2020/0296591 A1* | 9/2020 | Alriksson | H04B 7/0413 |
| 2021/0297193 A1* | 9/2021 | Noh | H04L 1/1614 |
| 2021/0298045 A1* | 9/2021 | Kim | H04W 72/1268 |
| 2021/0298075 A1* | 9/2021 | Talarico | H04W 72/042 |

OTHER PUBLICATIONS

Huawei, et al., "Coexistence and Channel Access for NR Unlicensed Band Operations", 3GPP TSG RAN WG1 Meeting #94bis, 3GPP Draft; R1-1810126, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 29, 2018 (Sep. 29, 2018), 14 Pages, XP051517541, Retrieved from the Internet: URL: http://www.3gpp.org/ftp/tsg%5Fran/WG1%5FRL1/TSGR1%5F94b/Docs/R1%2D1810126%2Ezip [retrieved on Dec. 11, 2018].
Partial International Search Report—PCT/US2019/053884—ISA/EPO—dated Jan. 15, 2020.

* cited by examiner

MULTI-CHANNEL LISTEN BEFORE TALK WITH WIDEBAND TRANSMISSION IN NEW RADIO IN UNLICENSED SPECTRUM

CROSS REFERENCE TO RELATED APPLICATION

This application claims priority to U.S. Provisional Application No. 62/743,368, filed on Oct. 9, 2018, entitled "MULTI-CHANNEL LISTEN BEFORE TALK WITH WIDEBAND TRANSMISSION IN NEW RADIO IN UNLICENSED SPECTRUM," which is hereby expressly incorporated by reference herein.

FIELD OF THE DISCLOSURE

Aspects of the present disclosure generally relate to wireless communication, and to techniques and apparatuses for multi-channel listen before talk (LBT) with wideband transmission in New Radio in unlicensed spectrum (NR-U).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include performing rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels; receiving, based at least part on performing the rate matching on the per-channel basis and after a transmission of the plurality of transport blocks on the plurality of channels, per-channel acknowledgment information associated with the plurality of channels; and selectively adjusting, based at least in part on the per-channel acknowledgment information, a plurality of contention windows, each associated with a listen before talk (LBT) procedure to be performed on a respective one of the plurality of channels.

In some aspects, a wireless communication device for wireless communication may include memory and one or more processors operatively coupled to the memory. The memory and the one or more processors may be configured to perform rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels; receive, based at least part on performing the rate matching on the per-channel basis and after a transmission of the plurality of transport blocks on the plurality of channels, per-channel acknowledgment information associated with the plurality of channels; and selectively adjust, based at least in part on the per-channel acknowledgment information, a plurality of contention windows, each associated with an LBT procedure to be performed on a respective one of the plurality of channels.

In some aspects, a non-transitory computer-readable medium may store one or more instructions for wireless communication. The one or more instructions, when executed by one or more processors of a wireless communication device, may cause the one or more processors to perform rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels; receive, based at least part on performing the rate matching on the per-channel basis and after a transmission of the plurality of transport blocks on the plurality of channels, per-channel acknowledgment information associated with the plurality of channels; and selectively adjust, based at least in part on the per-channel acknowledgment information, a plurality of contention windows, each associated with an LBT procedure to be performed on a respective one of the plurality of channels.

In some aspects, an apparatus for wireless communication may include means for performing rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels; means for receiving, based at least part on performing the rate matching on the per-channel basis and after a transmission of the plurality of transport blocks on the plurality of channels, per-channel acknowledgment information associated with the plurality of channels; and means for selectively adjusting, based at least in part on the per-channel acknowledgment information, a plurality of contention windows, each associated with an LBT procedure to be performed on a respective one of the plurality of channels.

In some aspects, a method of wireless communication, performed by a wireless communication device, may include receiving measurement information for each of a plurality of channels in a wideband channel of an unlicensed spectrum, wherein, for each of the plurality of channels, the measurement information includes information associated with a respective signal-to-noise ratio (SNR) measurement or a respective interference measurement; and selectively adjusting, based at least in part on the measurement information, a plurality of contention windows, each associated with an LBT procedure to be performed on a respective one of the plurality of channels.

In some aspects, a wireless communication device for wireless communication may include memory and one or more processors operatively coupled to the memory. The memory and the one or more processors may be configured to receive measurement information for each of a plurality of channels in a wideband channel of an unlicensed spectrum, wherein, for each of the plurality of channels, the measurement information includes information associated with a respective SNR measurement or a respective interference measurement; and selectively adjust, based at least in part on the measurement information, a plurality of contention windows, each associated with an LBT procedure to be performed on a respective one of the plurality of channels.

In some aspects, a non-transitory computer-readable medium may store one or more instructions for wireless communication. The one or more instructions, when executed by one or more processors of a wireless communication device, may cause the one or more processors to receive measurement information for each of a plurality of channels in a wideband channel of an unlicensed spectrum, wherein, for each of the plurality of channels, the measurement information includes information associated with a respective SNR measurement or a respective interference measurement; and selectively adjust, based at least in part on the measurement information, a plurality of contention windows, each associated with an LBT procedure to be performed on a respective one of the plurality of channels.

In some aspects, an apparatus for wireless communication may include means for receiving measurement information for each of a plurality of channels in a wideband channel of an unlicensed spectrum, wherein, for each of the plurality of channels, the measurement information includes information associated with a respective SNR measurement or a respective interference measurement; and means for selectively adjusting, based at least in part on the measurement information, a plurality of contention windows, each associated with an LBT procedure to be performed on a respective one of the plurality of channels.

In some aspects, a method of wireless communication, performed by a wireless communication device, may include performing wireless local area network (WLAN) preamble detection for each of a plurality of channels in a wideband channel of an unlicensed spectrum; and selectively adjusting a bandwidth, associated with an LBT procedure, based at least in part on a result of performing the WLAN preamble detection for each of the plurality of channels.

In some aspects, a wireless communication device for wireless communication may include memory and one or more processors operatively coupled to the memory. The memory and the one or more processors may be configured to perform WLAN preamble detection for each of a plurality of channels in a wideband channel of an unlicensed spectrum; and selectively adjust a bandwidth, associated with an LBT procedure, based at least in part on a result of performing the WLAN preamble detection for each of the plurality of channels.

In some aspects, a non-transitory computer-readable medium may store one or more instructions for wireless communication. The one or more instructions, when executed by one or more processors of a wireless communication device, may cause the one or more processors to perform WLAN preamble detection for each of a plurality of channels in a wideband channel of an unlicensed spectrum; and selectively adjust a bandwidth, associated with an LBT procedure, based at least in part on a result of performing the WLAN preamble detection for each of the plurality of channels.

In some aspects, an apparatus for wireless communication may include means for performing WLAN preamble detection for each of a plurality of channels in a wideband channel of an unlicensed spectrum; and means for selectively adjusting a bandwidth, associated with an LBT procedure, based at least in part on a result of performing the WLAN preamble detection for each of the plurality of channels.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
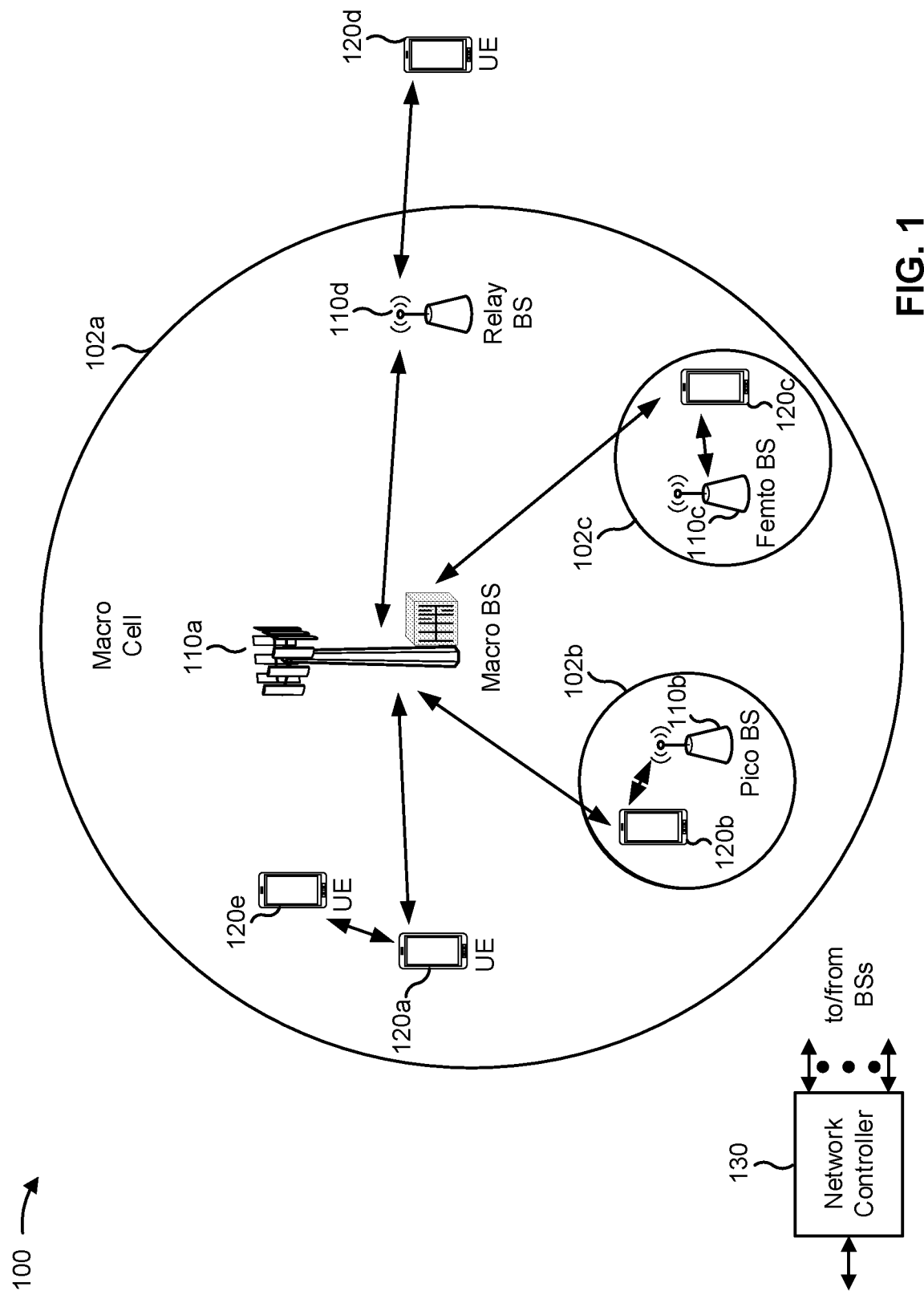
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
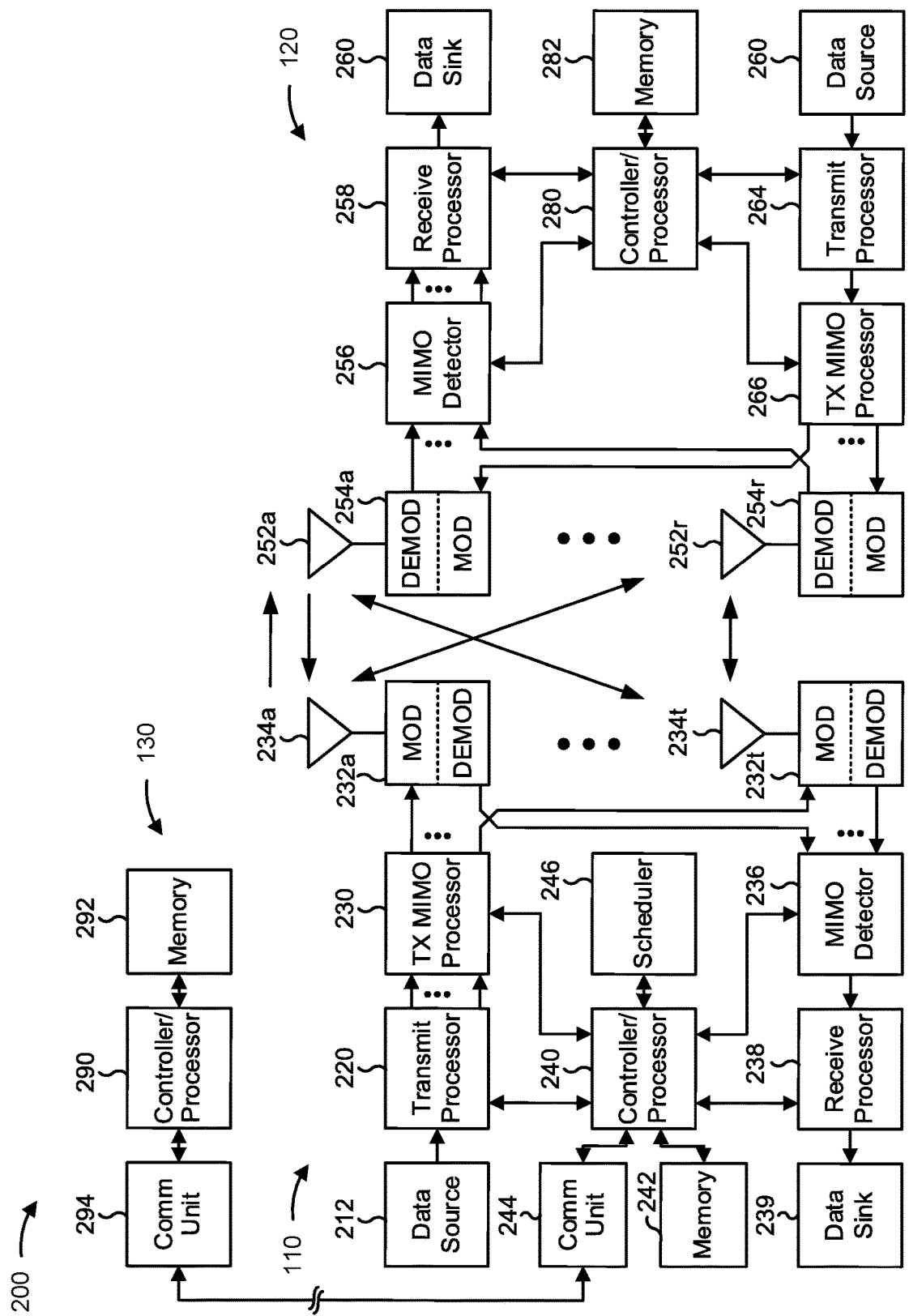
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-channel LBT with wideband transmission in NR-U, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 1000 of FIG. 10, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, a wireless communication device (e.g., base station 110, UE 120) may include means for performing rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels; means for receiving, based at least part on performing the rate matching on the per-channel basis and after a transmission of the plurality of transport blocks on the plurality of channels, per-channel acknowledgment information associated with the plurality of channels; means for selectively adjusting, based at least in part on the per-channel acknowledgment information, a plurality of contention windows, each associated with an LBT procedure to be performed on a respective one of the plurality of channels; and/or the like. In some aspects, such means may include one or more components of base station 110 described in connection with FIG. 2 and/or one or more components of UE 12 described in connection with FIG. 2.

In some aspects, a wireless communication device (e.g., base station 110, UE 120) may include means for receiving measurement information for each of a plurality of channels in a wideband channel of an unlicensed spectrum, wherein, for each of the plurality of channels, the measurement information includes information associated with a respective SNR measurement or a respective interference measurement; means for selectively adjusting, based at least in part on the measurement information, a plurality of contention windows, each associated with an LBT procedure to be performed on a respective one of the plurality of channels; and/or the like. In some aspects, such means may include one or more components of base station 110 described in connection with FIG. 2 and/or one or more components of UE 12 described in connection with FIG. 2.

In some aspects, a wireless communication device (e.g., base station 110, UE 120) may include means for performing WLAN preamble detection for each of a plurality of channels in a wideband channel of an unlicensed spectrum; means for selectively adjusting a bandwidth, associated with an LBT procedure, based at least in part on a result of performing the WLAN preamble detection for each of the plurality of channels; and/or the like. In some aspects, such means may include one or more components of base station 110 described in connection with FIG. 2 and/or one or more components of UE 12 described in connection with FIG. 2.

As indicated above, FIG. 2 is provided merely as an example. Other examples may differ from what is described with regard to FIG. 2.

Figure 3A:
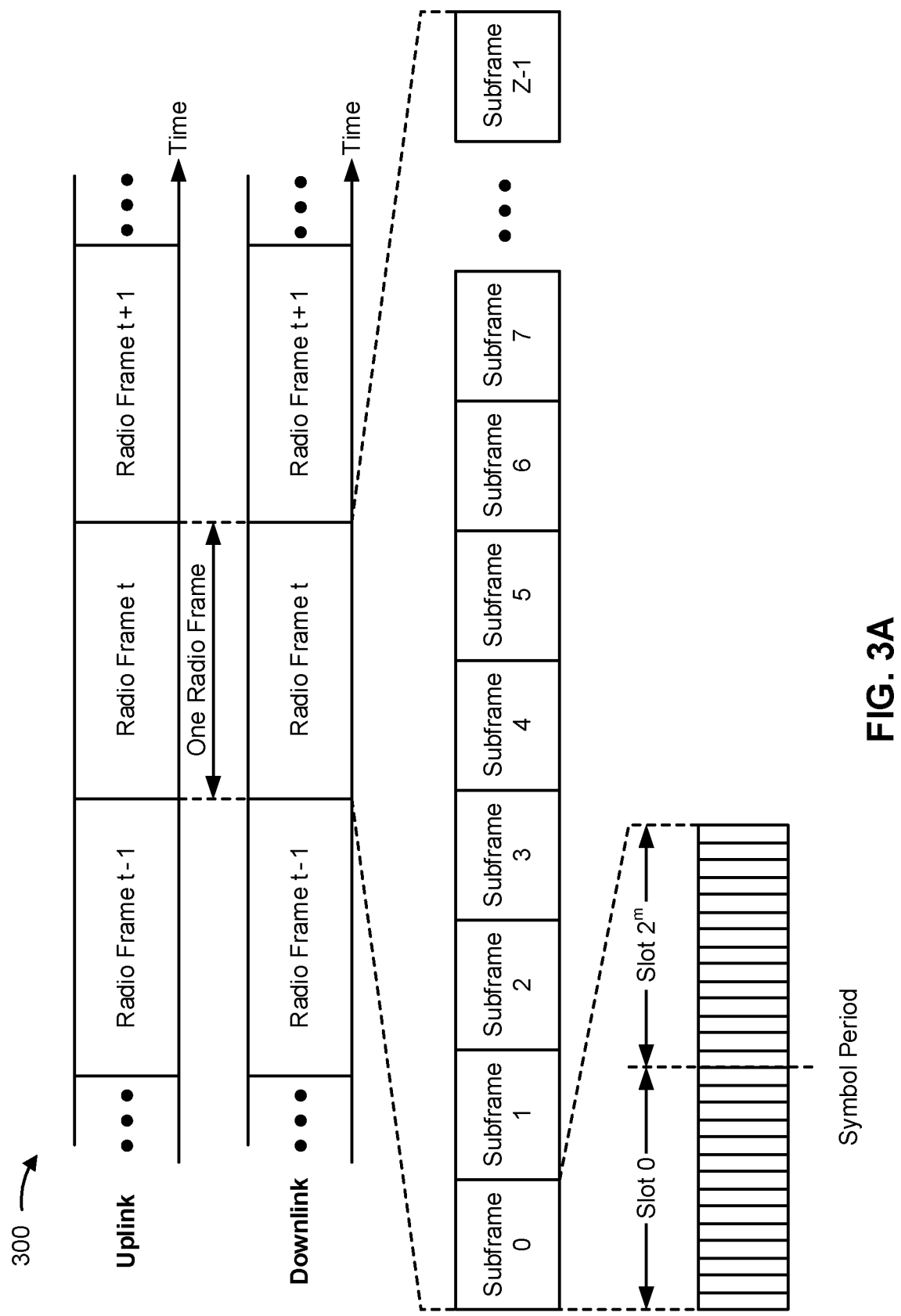
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
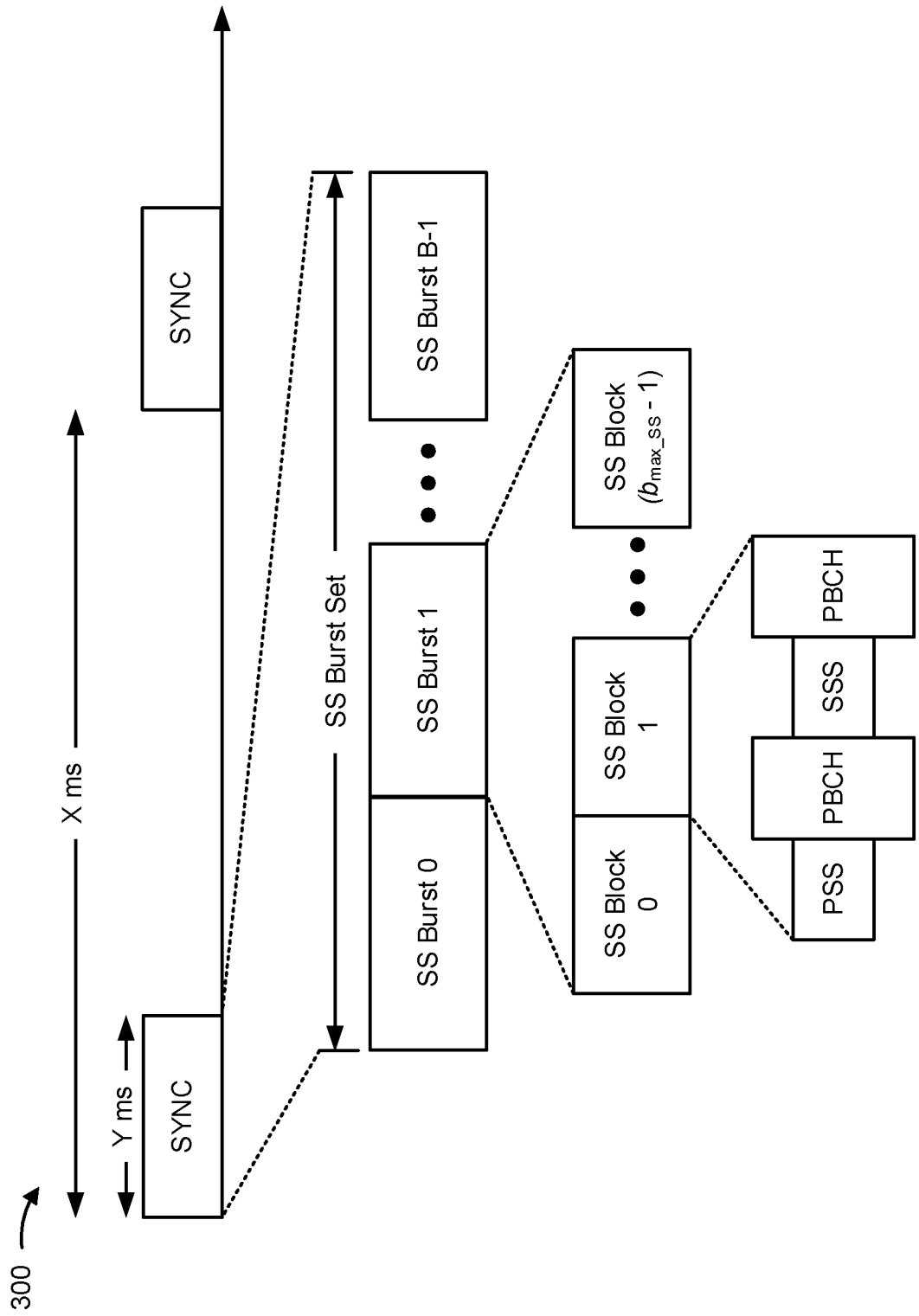
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
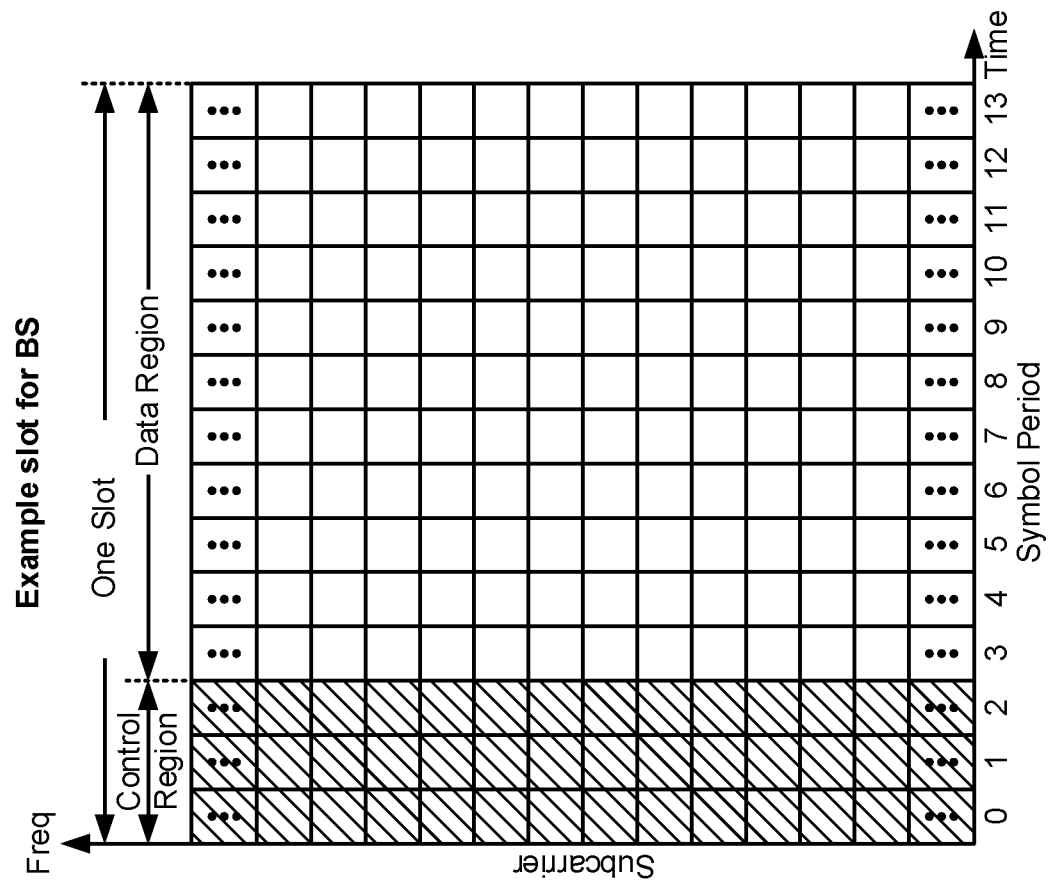
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
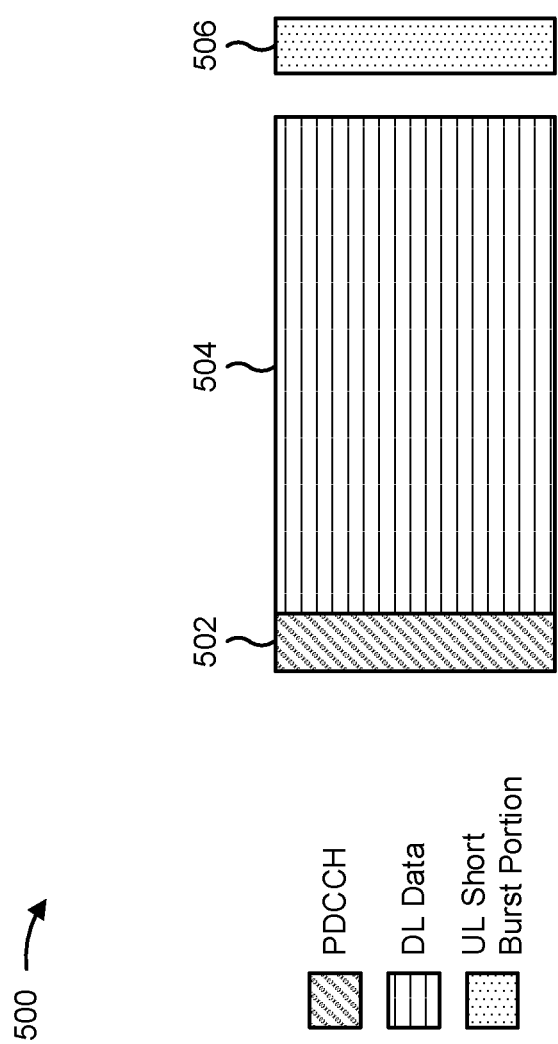
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

Figure 6:
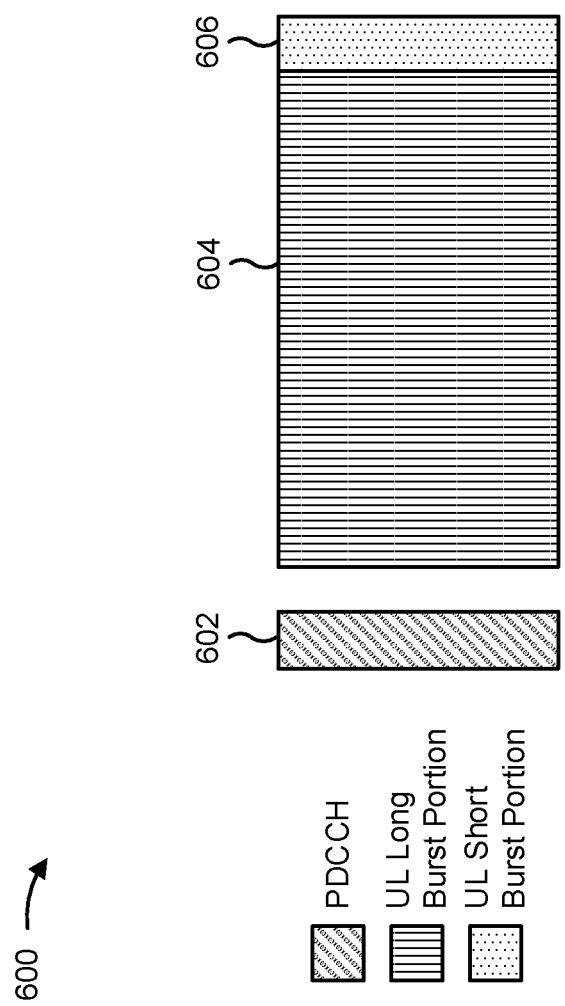
FIG. 6 is a diagram illustrating an example of an uplink (UL)-centric slot, in accordance with various aspects of the present disclosure.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided merely as an example. Other examples may differ from what is described with regard to FIG. 6.

For wideband operation on the downlink, a single serving cell may operate within a carrier with bandwidth larger than 20 MHz. Here, multiple bandwidth parts can be configured, a single bandwidth part may be activated, and a base station may transmit a downlink transmission (e.g., a PDSCH communication) on one or more parts or a whole of the single active bandwidth part where a clear channel assessment is successful at the base station. For an uplink transmission (e.g., a PUSCH communication) in a serving cell with carrier bandwidth greater than an LBT bandwidth, for the case where a UE performs a clear channel assessment before the uplink transmission, the UE may transmit the uplink transmission only if a clear channel assessment is successful at the UE in all LBT bandwidths of the scheduled uplink transmission. Alternatively, in some cases, the UE may transmit the uplink transmission in all or a subset of the LBT bandwidths of the scheduled uplink communication for which the clear channel assessment is successful at the UE. In some cases, when a group common PDCCH (GC-PDCCH) is configured, an explicit indication via GC-PDCCH may be supported as a mechanism to inform the UE that one or more carriers and/or LBT bandwidths are not available or are available for downlink reception, at least for one or more slots that are not at the beginning of a downlink transmission burst.

Wideband operation is beneficial for overall system performance when using an unlicensed spectrum for wireless communications. For example, in the case of NR in the unlicensed spectrum (NR-U), operation using a wideband channel (e.g., a channel with a bandwidth that is greater than 20 MHz, such as an 80 MHz wideband channel, a 40 MHz wideband channel, and/or the like) is beneficial for overall performance of the NR system. In such a case, the wideband channel can include multiple channels (e.g., multiple 20 MHz channels) (sometimes referred to as sub-bands or sub-channels).

However, other nodes can be configured to use one or more channels included in the wideband channel of the unlicensed spectrum (e.g., a wireless local area network (WLAN) node, such as a WiFi node) and, as a result, the absence of other nodes configured to use one or more channels of the wideband channel cannot be guaranteed. Therefore, before using the wideband channel, a wireless communication device may need to perform a listen before talk (LBT) procedure in order to determine availability of resources in the wideband channel.

A wideband LBT procedure (e.g., a single LBT procedure for the entire wideband channel) could be used by the wireless communication device to assess availability of the wideband channel. However, in such a case, use of even a single channel in the wideband channel by another node would prevent the wireless communication device from transmitting on any channels of the wideband channel (even though some channels may be available). Consequently, utilization of radio resources can be reduced when a wideband LBT procedure is used to assess availability of the wideband channel.

In order to address this issue, a granularity of the LBT procedure should be consistent with that of other nodes that can operate in the unlicensed spectrum. For example, a given WiFi node can be configured to communicate using a 20 MHz channel of the unlicensed spectrum. As a result, the granularity of the LBT procedure performed by the wireless communication device should be 20 MHz (e.g., such that an LBT procedure is performed for each 20 MHz channel in the wideband channel of the unlicensed spectrum).

Typically, an LBT procedure, associated with a given channel, relies on acknowledgment information (e.g., an acknowledgment of a transmission (ACK) or a negative acknowledgment of a transmission (NACK)) for the given channel. In other words, the wireless communication device performs an LBT procedure for each channel, where an LBT procedure associated with a given channel is reliant on acknowledgment information associated with the given channel. For example, the acknowledgment information, associated with the given channel, is used to selectively adjust a contention window associated with the LBT procedure for the given channel.

However, in NR, frequency first mapping is used when mapping coded bits of a given transport block (TB) in association with transmitting a given transmission. In other words, coded bits of a given TB are mapped across resources in the frequency domain before being mapped across resources in the time domain. As a result of this frequency first mapping, acknowledgment information received by the wireless communication device will not be on a per-channel basis. Rather, the acknowledgment information would correspond to the entire wideband channel and, therefore, could not be used to adjust contention windows of individual channels in the wideband channel.

Some implementations described herein provide techniques and apparatuses for multi-channel LBT with wideband transmission in NR-U.

Figure 7:
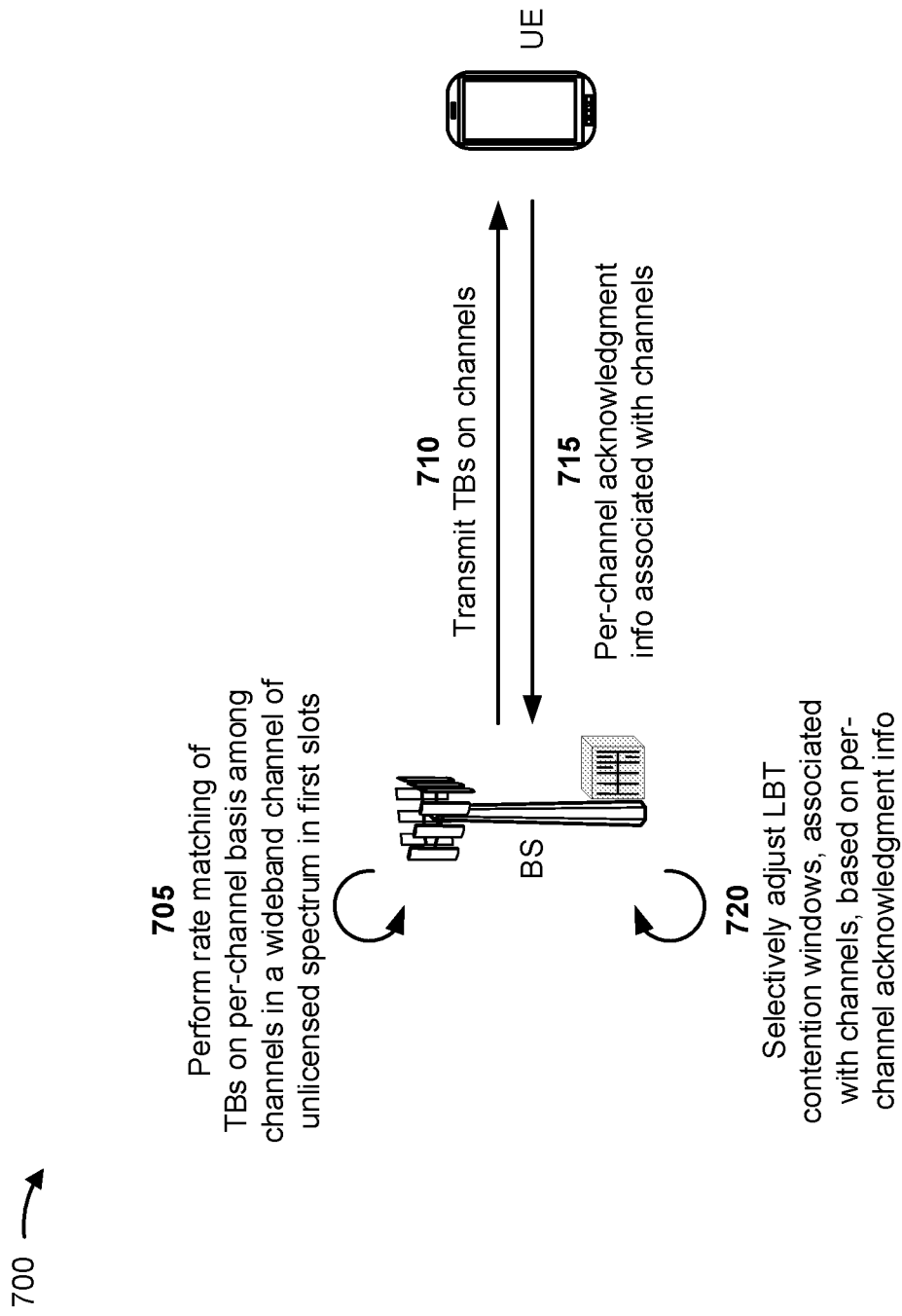
FIG. 7 is a diagram illustrating an example of receiving acknowledgment information on a per-channel basis such that contention windows, associated with LBT procedures for a plurality of channels in a wideband channel of a NR unlicensed spectrum, can be selectively adjusted, in accordance with various aspects of the present disclosure.

FIG. 7 is a diagram illustrating an example 700 of a wireless communication device receiving acknowledgment information on a per-channel basis such that contention windows, associated with LBT procedures for a plurality of channels in a wideband channel of a NR unlicensed spectrum, can be selectively adjusted, in accordance with various aspects of the present disclosure.

In FIG. 7, a wireless communication device (e.g., a base station (BS), such as base station 110) is configured to communicate with another wireless communication device (e.g., a UE, such as UE 120) using wideband channel transmissions in an unlicensed spectrum (e.g., a NR unlicensed spectrum). Further, the base station is to perform an LBT procedure for each channel (e.g., each 20 MHz channel) of a plurality of channels in the wideband channel (e.g., an 80 MHz channel) in association with assessing channel availability, as described above.

As shown in in FIG. 7, and by reference number 705, the base station may perform rate matching of coded bits of a set of transport blocks (TBs) on a per-channel basis among the plurality of channels in the wideband channel of the unlicensed spectrum. For example, the base station may perform rate matching of the coded bits of the set of TBs on the per-channel basis such that the coded bits of the set of TBs are mapped to symbols of a first channel, followed by symbols of a second channel, and so on. Notably, mapping the coded bits on the per-channel basis causes the coded bits to be mapped to resources of each channel (e.g., within the channel in both the frequency and time domains) rather than first mapping the coded bits across resources of the wideband channel in the frequency domain, as is the case with frequency first mapping that is typically employed in NR.

In some aspects, as indicated in FIG. 7, the rate matching may be performed on the per-channel basis in a first set of slots of a transmission opportunity (e.g., an initial slot of a transmission opportunity, the first two slots of the transmission opportunity, the first three slots of the transmission opportunity, and/or the like). In some aspects, as a result of the per-channel rate matching in the first set of slots, the base station may receive per-channel acknowledgment information (e.g., along with code block group (CBG) based feedback, where each channel can be associated with a different CBG), as described below.

In some aspects, the rate matching is performed on the per-channel basis in the first set of slots since, at the time the base station is preparing the set of TBs, the base station may not have determined results of LBT procedures for each of the plurality of channels. In other words, the base station may perform the rate matching on the per-channel basis in the first set of slots since, at the time the base station prepares the set of TBs, the base station does not know whether a given channel, of the plurality of channels in the wideband channel, is clear for use by the base station in association with transmitting a transmission.

As further shown in FIG. 7, and by reference number 710, the base station may transmit the set of TBs on the plurality of channels in the wideband channel after performing the rate matching on the per-channel basis. For example, the base station may transmit, to the UE, a transmission (e.g., a PDSCH transmission), including a signal representing the coded bits of the set of TBs.

In some aspects, the base station may provide an indication that the rate matching was performed on the per-channel basis to the UE. For example, the base station may provide an indication that the rate matching was performed on the per-channel basis in a grant (e.g., included in a PDCCH), associated with the transmission, that is provided to the UE. In some aspects, an indication that the rate matching was performed on the per-channel basis may be implicitly signaled by the base station (e.g., such that the per-channel rate matching can be inferred by the UE based on a signal provided by the base station).

In some aspects, the set of TBs may include a single TB. Here, the base station performs the rate matching such that the coded bits of the TB are mapped across the plurality of channels. Alternatively, in some aspects, the set of TBs can include multiple TBs. In such a case, the base station may perform the rate matching such that coded bits of each TB, of the multiple TBs, are mapped to a respective one of the plurality of channels, in some aspects. In other words, coded bits of each TB may be mapped to a different one of the plurality of channels of the wideband channel. In some aspects, when the set of TBs includes multiple TBs, the base station may provide multiple grants to the UE, where each grant includes information associated with a respective one of the multiple TBs. Alternatively, the base station may provide a single grant to the UE, where the single grant includes information associated with each of the multiple TBs.

In some aspects, after performing the rate matching on the per-channel basis in the first set of slots, the base station may perform rate matching of coded bits of another transport block on the frequency first basis in a second set of slots of the transmission opportunity. In other words, after performing rate matching on the per-channel basis in the first set of slots of the transmission opportunity, the base station may resume frequency first rate matching in a second set of slots of the transmission opportunity. In some aspects, the base station may resume performing rate matching on the frequency first basis in the second set of slots since, at the time the base station prepares the other TB, the base station should know whether a given channel, of the plurality of channels in the wideband channel, is clear for use by the base station in association with transmitting a transmission. In some aspects, the base station may resume frequency first rate matching in the second set of slots in order to reduce an amount of time needed to process the transmission by the UE and/or in order to enable a self-contained transmission opportunity structure in which acknowledgment information is sent within the same transmission opportunity.

As further shown in FIG. 7, and by reference number 715, as a result of performing rating matching on the per-channel basis, the base station may receive per-channel acknowledgment information associated with the plurality of channels. For example, since the rate matching was performed on the per-channel basis (rather than frequency first) the acknowledgment information, provided by the UE, will be on a per-channel basis (e.g., the acknowledgment information will include ACK/NACK for each channel of the plurality of channels).

As such, as shown by reference number 720, the base station may selectively adjust a plurality of contention windows, each associated with an LBT procedure for a respective one of the plurality of channels, based at least in part on the per-channel acknowledgment information. For example, the base station may, based at least in part on the per-channel acknowledgment information, increase, decrease, or leave unchanged, contention window lengths for LBT procedures associated with each of the plurality of channels. In this way, multi-channel LBT with wideband transmission in NR-U can be realized.

In some aspects, a channel, of the plurality of channels, may be punctured in association with transmitting the transmission (e.g., when the channel is in use by another node, or is otherwise determined to be unavailable). In such a case, the base station may selectively adjust a contention window, associated with an LBT procedure for the channel, based at least in part on acknowledgement information associated with a subsequent transmission.

Notably, while the above described example is described in the context of a downlink transmission (e.g., a PDSCH transmission), the above described techniques can be applied to an uplink transmission, in some aspects (e.g., an autonomous uplink transmission).

As indicated above, FIG. 7 is provided as an example. Other examples may differ from what is described with respect to FIG. 7.

Figure 8:
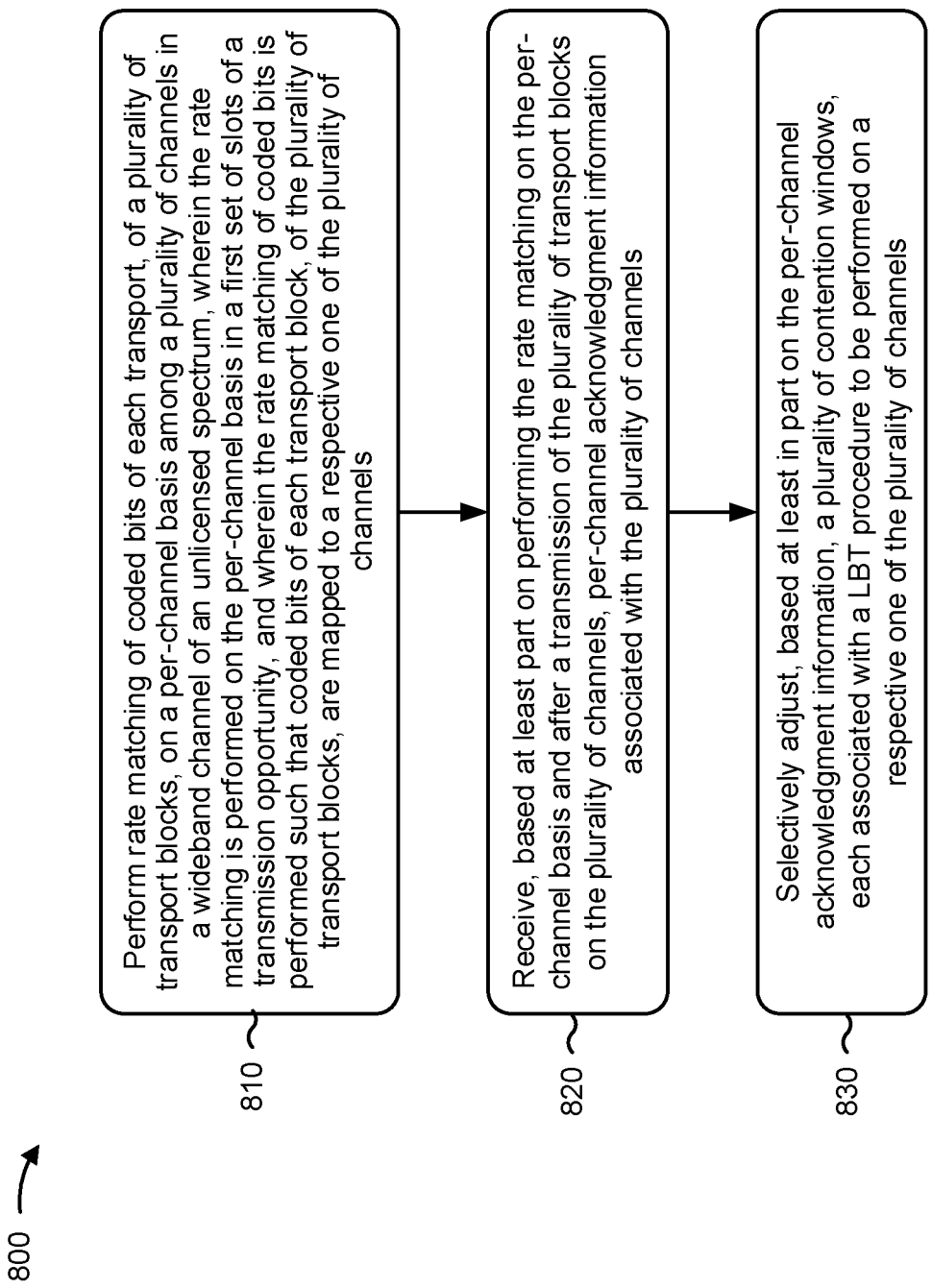
FIG. 8 is a diagram illustrating an example process performed, for example, by a wireless communication device, in accordance with various aspects of the present disclosure.

FIG. 8 is a diagram illustrating an example process 800 performed, for example, by a wireless communication device, in accordance with various aspects of the present disclosure. Example process 800 is an example where a wireless communication device (e.g., base station 110, UE 120) performs operations associated with modified rate matching in association with multi-channel LBT with wideband transmission in NR-U, as described herein.

As shown in FIG. 8, in some aspects, process 800 may include performing rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels (block 810). For example, the wireless communication device (e.g., using controller processor 240/280, transmit processor 220/264, and/or the like) may perform rate matching of coded bits of each transport block, of a plurality of transport blocks, on a per-channel basis among a plurality of channels in a wideband channel of an unlicensed spectrum, wherein the rate matching is performed on the per-channel basis in a first set of slots of a transmission opportunity, and wherein the rate matching of coded bits is performed such that coded bits of each transport block, of the plurality of transport blocks, are mapped to a respective one of the plurality of channels, as described above.

As shown in FIG. 8, in some aspects, process 800 may include receiving, based at least part on performing the rate matching on the per-channel basis and after a transmission of the plurality of transport blocks on the plurality of channels, per-channel acknowledgment information associated with the plurality of channels (block 820). For example, the wireless communication device (e.g., using antenna 234/252, receive processor 238/258, controller/processor 240/280, and/or the like) may receive, based at least part on performing the rate matching on the per-channel basis and after a transmission of the plurality of transport blocks on the plurality of channels, per-channel acknowledgment information associated with the plurality of channels, as described above.

As shown in FIG. 8, in some aspects, process 800 may include selectively adjusting, based at least in part on the per-channel acknowledgment information, a plurality of contention windows, each associated with an LBT procedure to be performed on a respective one of the plurality of channels (block 830). For example, the wireless communication device (e.g., using controller processor 240/280, transmit processor 220/264, and/or the like) may selectively adjust, based at least in part on the per-channel acknowledgment information, a plurality of contention windows, each associated with an LBT procedure to be performed on a respective one of the plurality of channels, as described above.

Process 800 may include additional aspects, such as any single aspect or any combination of aspects described below and/or in connection with one or more other processes described elsewhere herein.

In a first aspect, the transmission is a physical downlink shared channel (PDSCH) transmission.

In a second aspect, alone or in combination with the first aspect, multiple grants, each associated with a respective one of the plurality of transport blocks, are provided to another wireless communication device.

In a third aspect, alone or in combination with the first aspect, a single grant, associated with each of the plurality of transport blocks, is provided to another wireless communication device.

In a fourth aspect, alone or in combination with one or more of the first through third aspects, when a channel, of the plurality of channels, is punctured in association with transmitting the transmission, a contention window, of the plurality of contention windows and associated with the channel, is selectively adjusted based at least in part on acknowledgement information associated with a subsequent transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
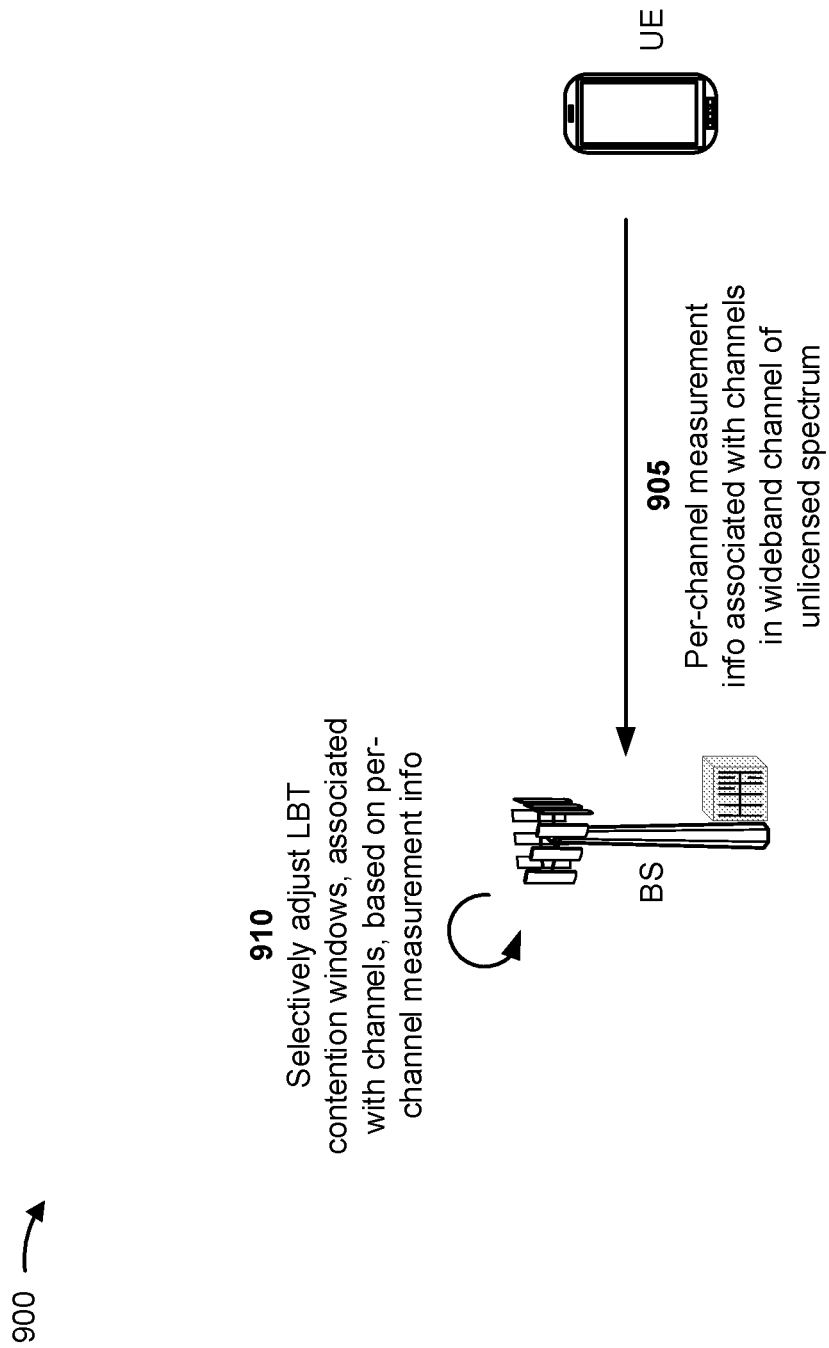
FIG. 9 is a diagram illustrating an example of receiving measurement information associated with a plurality of channels in a wideband channel of a NR unlicensed spectrum, and selectively adjusting contention windows, associated with LBT procedures for the plurality of channels, based at least in part on the measurement information, in accordance with various aspects of the present disclosure.

FIG. 9 is a diagram illustrating an example 900 of receiving measurement information associated with a plurality of channels in a wideband channel of an NR unlicensed spectrum, and selectively adjusting contention windows, associated with LBT procedures for the plurality of channels, based at least in part on the measurement information, in accordance with various aspects of the present disclosure.

In FIG. 9, a wireless communication device (e.g., a base station, such as base station (BS) 110) is configured to communicate with another wireless communication device (e.g., a UE, such as UE 120) using wideband channel transmissions in an unlicensed spectrum (e.g., a NR unlicensed spectrum). Further, the base station is to perform an LBT procedure for each channel (e.g., each 20 MHz channel) of a plurality of channels in the wideband channel (e.g., an 80 MHz channel) in association with assessing channel availability, as described above.

As shown in in FIG. 9, and by reference number 905, the base station may receive measurement information for each of the plurality of channels in the wideband channel of the unlicensed spectrum. The measurement information may include, for example, information associated with a respective signal-to-noise ratio (SNR) measurement (e.g., an SNR measurement that is based at least in part on a measurement of a demodulation reference signal (DMRS)) for a given channel of the plurality of channels, an interference measurement for a given channel of the plurality of channels (e.g., an interference measurement that is based at least in part on a measurement of an interference measurement channel state information reference signal (IMR-CSI-RS)), and/or the like.

In some aspects, the base station may receive the measurement information on a periodic basis (e.g., when the UE is configured to report measurements, associated with each channel, at particular intervals of time). In some aspects, the base station may receive the measurement information based at least in part on sending a request to the UE (i.e., the base station may request that the UE provide measurement information associated with each of the plurality of channels).

As further shown in FIG. 9, and by reference number 910, the base station may selectively adjust a plurality of contention windows, each associated with an LBT procedure associated with a respective one of the plurality of channels, based at least in part on the measurement information. For example, the base station may, based at least in part on the measurement information, increase, decrease, or leave unchanged, contention window lengths for LBT procedures associated with each of the plurality of channels. In this way, multi-channel LBT with wideband transmission in NR-U can be realized. Notably, in example 900, the contention windows are selectively adjusted based at least in part on the measurement information (rather than acknowledgment information associated with each channel, as described above in association with FIGS. 7 and 8).

As indicated above, FIG. 9 is provided as an example. Other examples may differ from what is described with respect to FIG. 9.

Figure 10:
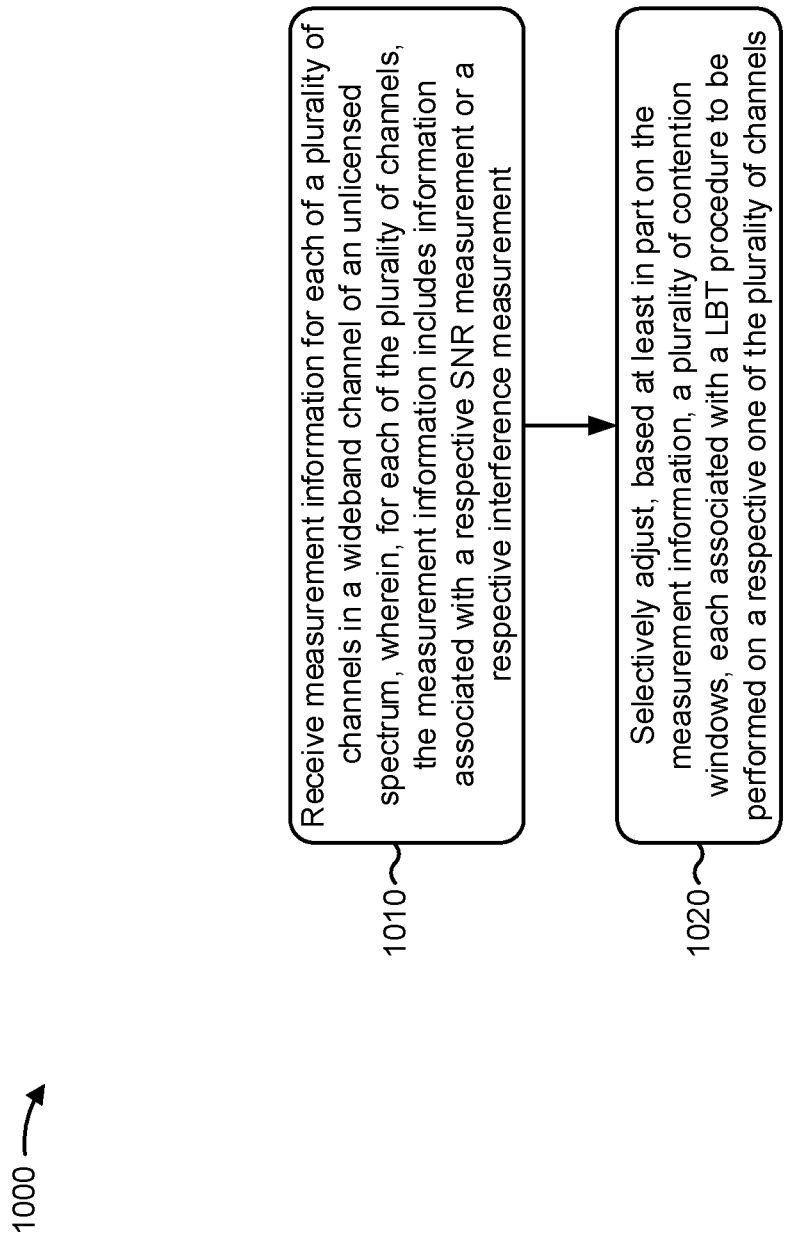
FIG. 10 is a diagram illustrating an example process performed, for example, by a wireless communication device, in accordance with various aspects of the present disclosure.

FIG. 10 is a diagram illustrating an example process 1000 performed, for example, by a wireless communication device, in accordance with various aspects of the present disclosure. Example process 1000 is an example where a wireless communication device (e.g., base station 110, UE 120) performs operations associated with SNR and/or interference level reporting per channel in association with multi-channel LBT with wideband transmission in NR-U, as described herein.

As shown in FIG. 10, in some aspects, process 1000 may include receiving measurement information for each of a plurality of channels in a wideband channel of an unlicensed spectrum, wherein, for each of the plurality of channels, the measurement information includes information associated with a respective SNR measurement or a respective interference measurement (block 1010). For example, the wireless communication device (e.g., using antenna 234/252, receive processor 238/258, controller/processor 240/280, and/or the like) may receive measurement information for each of a plurality of channels in a wideband channel of an unlicensed spectrum, wherein, for each of the plurality of channels, the measurement information includes information associated with a respective SNR measurement or a respective interference measurement, as described above.

As shown in FIG. 10, in some aspects, process 1000 may include selectively adjusting, based at least in part on the measurement information, a plurality of contention windows, each associated with an LBT procedure to be performed on a respective one of the plurality of channels (block 1020). For example, the wireless communication device (e.g., using antenna 232/252, receive processor 238/258, controller/processor 240/280, and/or the like) may selectively adjust, based at least in part on the measurement information, a plurality of contention windows, each associated with an LBT procedure to be performed on a respective one of the plurality of channels, as described above.

Process 1000 may include additional aspects, such as any single aspect or any combination of aspects described below and/or in connection with one or more other processes described elsewhere herein.

In a first aspect, the SNR measurement is based at least in part on a measurement of a demodulation reference signal (DMRS).

In a second aspect, alone or in combination with the first aspect, the interference measurement is based at least in part on a measurement of an interference measurement resource channel state information reference signal (IMR-CSI-RS).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
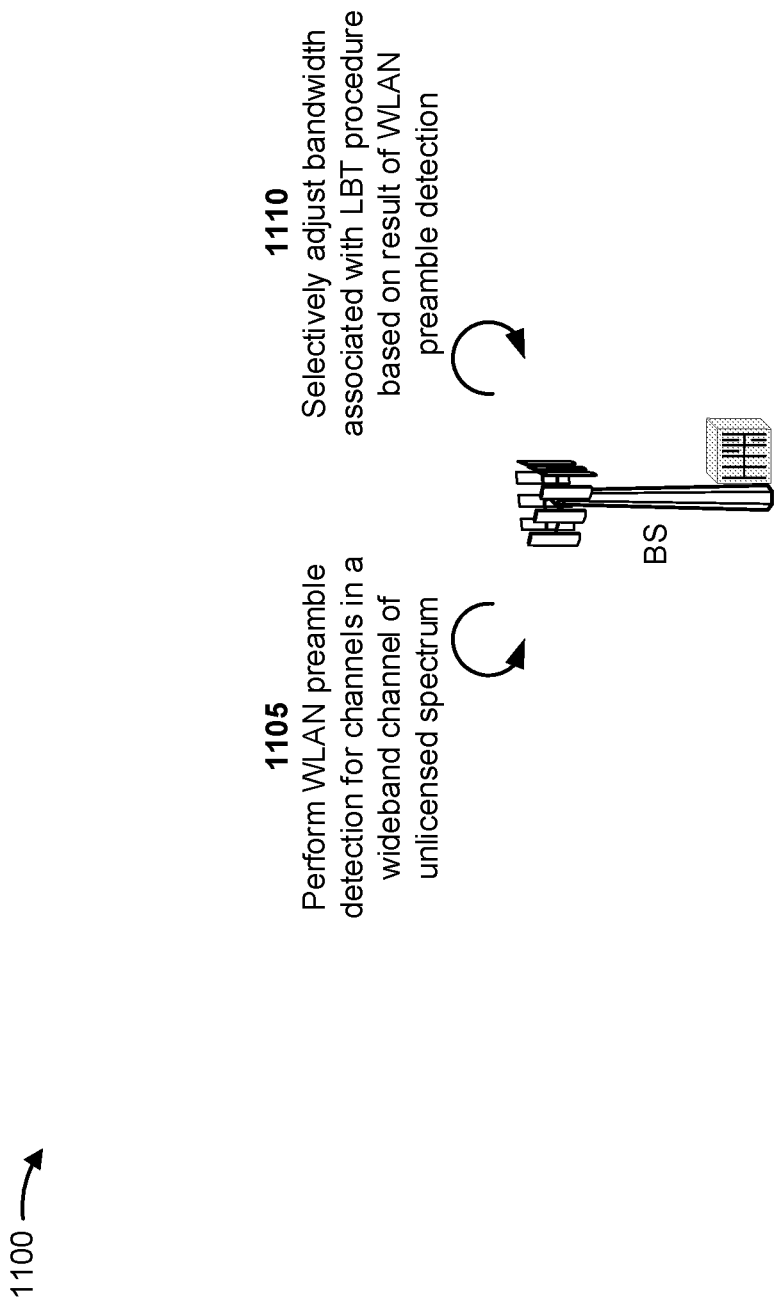
FIG. 11 is a diagram illustrating an example of performing wireless local area network preamble detection on a plurality of channels in a wideband channel of a NR unlicensed spectrum, and selectively adjusting a bandwidth of an LBT procedure, associated with the wideband channel, based at least in part on a result of the WLAN preamble detection, in accordance with various aspects of the present disclosure.

FIG. 11 is a diagram illustrating an example 1100 of performing wireless local area network preamble detection on a plurality of channels in a wideband channel of an NR unlicensed spectrum, and selectively adjusting a bandwidth of an LBT procedure, associated with the wideband channel, based at least in part on a result of the WLAN preamble detection, in accordance with various aspects of the present disclosure.

In FIG. 11, a wireless communication device (e.g., a base station (BS), such as base station 110) is configured to communicate with another wireless communication device (e.g., a UE, such as UE 120) using wideband channel transmissions in an unlicensed spectrum (e.g., a NR unlicensed spectrum). Further, the base station is to perform a wideband LBT procedure for the wideband channel in association with assessing channel availability. In some aspects, as described below, the base station may adapt a bandwidth of the wideband LBT procedure based at least in part on WLAN preamble detection.

As shown in in FIG. 11, and by reference number 1105, the base station may perform wireless local area network (WLAN) preamble detection (e.g., WiFi preamble detection) for each of a plurality of channels in the wideband channel of an unlicensed spectrum. For example, the base station may attempt to detect a WiFi preamble on each of the plurality of channels.

As shown by reference number 1110, the base station may selectively adjust a bandwidth, associated with an LBT procedure, based at least in part on a result of performing the WLAN preamble detection for each of the plurality of channels. For example, the base station may, based at least in part on a result of the WLAN preamble detection, adapt a bandwidth of an LBT procedure associated with the wideband channel. As a particular example, if the result of the WiFi preamble detection detects a WiFi preamble on one 20 MHz channel of four 20 MHz channels in the wideband channel, then the base station may adjust the bandwidth of the wideband LBT procedure such that the wideband LBT procedure is performed for the three available 20 MHz channels. In such a case, the base station may perform the wideband LBT procedure in association with assessing channel availability. In some aspects, the base station may provide information that identifies the bandwidth associated with the LBT procedure is signaled to the UE.

As indicated above, FIG. 11 is provided as an example. Other examples may differ from what is described with respect to FIG. 11.

Figure 12:
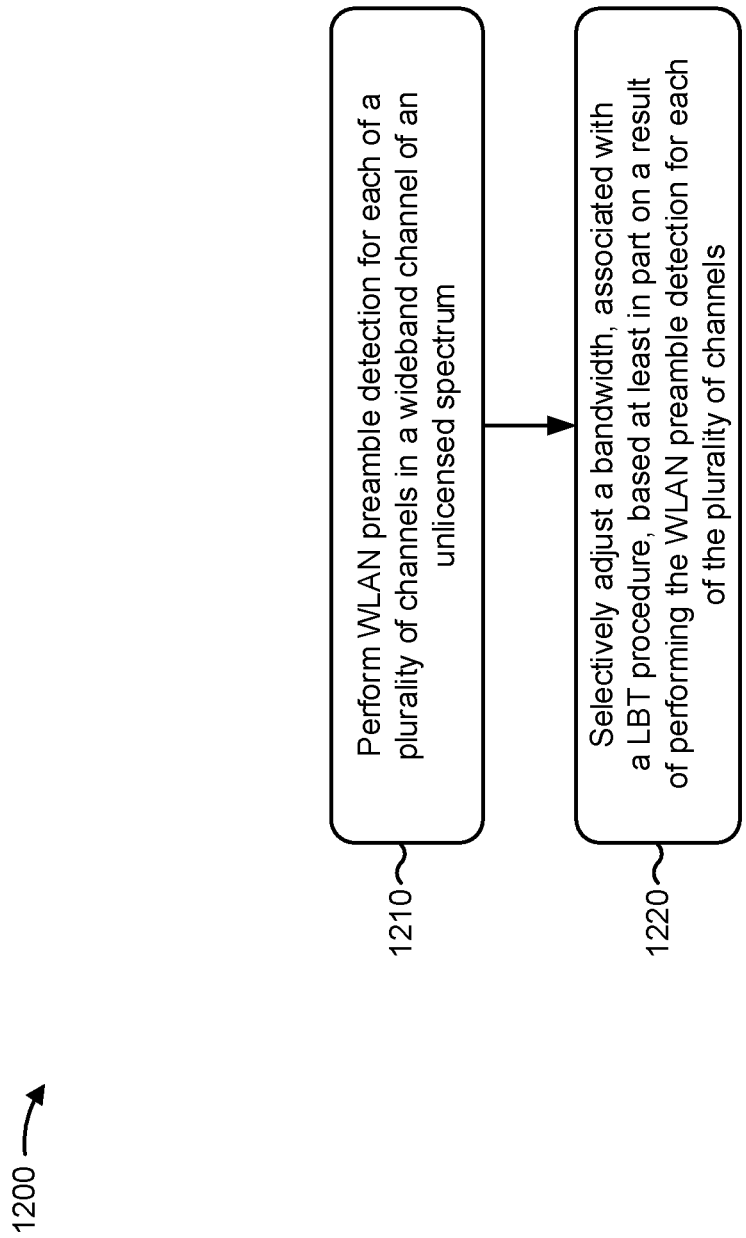
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., base station 110, UE 120) performs LBT bandwidth adaptation based on WLAN preamble detection, as described herein.

As shown in FIG. 12, in some aspects, process 1200 may include performing WLAN preamble detection for each of a plurality of channels in a wideband channel of an unlicensed spectrum (block 1210). For example, the wireless communication device (e.g., using antenna 232/252, receive processor 238/258, controller/processor 240/280, and/or the like) may perform WLAN preamble detection for each of a plurality of channels in a wideband channel of an unlicensed spectrum, as described above.

As shown in FIG. 12, in some aspects, process 1200 may include selectively adjusting a bandwidth, associated with an LBT procedure, based at least in part on a result of performing the WLAN preamble detection for each of the plurality of channels. (block 1220). For example, the wireless communication device (e.g., using receive processor 238/258, controller/processor 240/280, and/or the like) may selectively adjust a bandwidth, associated with an LBT procedure, based at least in part on a result of performing the WLAN preamble detection for each of the plurality of channels, as described above.

Process 1200 may include additional aspects, such as any single aspect or any combination of aspects described below and/or in connection with one or more other processes described elsewhere herein.

In some aspects, information that identifies the bandwidth associated with the LBT procedure is signaled to another wireless communication device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
    performing rate matching of coded bits of each transport block, of a plurality of transport blocks, on a per-channel basis of each of a plurality of channels in a wideband channel of an unlicensed spectrum,
        wherein the rate matching is performed on the per-channel basis in a first set of slots of a transmission opportunity, and
        wherein the rate matching of coded bits is performed such that coded bits of each transport block, of the plurality of transport blocks, are mapped to a respective one of the plurality of channels;
    receiving, based at least part on performing the rate matching on the per-channel basis and after a transmission of the plurality of transport blocks on the plurality of channels, per-channel acknowledgment information associated with the plurality of channels; and
    selectively adjusting, prior to performing a listen before talk (LBT) procedure and based at least in part on the per-channel acknowledgment information, a plurality of contention windows, each associated with the LBT procedure to be performed on a respective one of the plurality of channels,
        wherein, when a channel, of the plurality of channels, is punctured in association with transmitting the transmission of the plurality of transport blocks, a contention window, of the plurality of contention windows and associated with the channel, is selectively adjusted based at least in part on acknowledgement information associated with a subsequent transmission.

2. The method of claim 1, wherein the transmission of the plurality of transport blocks is a physical downlink shared channel (PDSCH) transmission.

3. The method of claim 1, wherein multiple grants, each associated with a respective one of the plurality of transport blocks, are provided to another wireless communication device.

4. The method of claim 1, wherein a single grant, associated with each of the plurality of transport blocks, is provided to another wireless communication device.

5. The method of claim 1, wherein performing the rate matching on the per-channel basis comprises:
performing the rate matching of coded bits of each transport block, of the plurality of transport blocks, for each of the plurality of channels.

6. The method of claim 5, wherein performing the rate matching on the per-channel basis causes the coded bits of each transport block, of the plurality of transport blocks, to be mapped to resources of each channel of the plurality of channels.

7. The method of claim 1, wherein the transmission includes a signal representing the coded bits of the plurality of transport blocks.

8. A wireless communication device for wireless communication, comprising:
a memory; and
one or more processors coupled to the memory, the one or more processors configured to:
perform rate matching of coded bits of each transport block, of a plurality of transport blocks, on a per-channel basis of each of a plurality of channels in a wideband channel of an unlicensed spectrum,
wherein the rate matching is performed on the per-channel basis in a first set of slots of a transmission opportunity, and
wherein the rate matching of coded bits is performed such that coded bits of each transport block, of the plurality of transport blocks, are mapped to a respective one of the plurality of channels;
receive, based at least part on performing the rate matching on the per-channel basis and after a transmission of the plurality of transport blocks on the plurality of channels, per-channel acknowledgment information associated with the plurality of channels; and
selectively adjust, prior to performing a listen before talk (LBT) procedure and based at least in part on the per-channel acknowledgment information, a plurality of contention windows, each associated with the LBT procedure to be performed on a respective one of the plurality of channels,
wherein, when a channel, of the plurality of channels, is punctured in association with transmitting the transmission of the plurality of transport blocks, a contention window, of the plurality of contention windows and associated with the channel, is selectively adjusted based at least in part on acknowledgement information associated with a subsequent transmission.

9. The wireless communication device of claim 8, wherein the transmission of the plurality of transport blocks is a physical downlink shared channel (PDSCH) transmission.

10. The wireless communication device of claim 8, wherein multiple grants, each associated with a respective one of the plurality of transport blocks, are provided to another wireless communication device.

11. The wireless communication device of claim 8, wherein a single grant, associated with each of the plurality of transport blocks, is provided to another wireless communication device.

12. The wireless communication device of claim 8, wherein the memory and the one or more processors, when performing the rate matching on the per-channel basis, are configured to:
perform the rate matching of coded bits of each transport block, of the plurality of transport blocks, for each of the plurality of channels.

13. The wireless communication device of claim 8, wherein the transmission includes a signal representing the coded bits of the plurality of transport blocks.

14. A non-transitory computer-readable medium storing a set of instructions, the set of instructions comprising:
one or more instructions that, when executed by one or more processors of a wireless communication device, cause the wireless communication device to:
perform rate matching of coded bits of each transport block, of a plurality of transport blocks, on a per-channel basis of each of a plurality of channels in a wideband channel of an unlicensed spectrum,
wherein the rate matching is performed on the per-channel basis in a first set of slots of a transmission opportunity, and
wherein the rate matching of coded bits is performed such that coded bits of each transport block, of the plurality of transport blocks, are mapped to a respective one of the plurality of channels;
receive, based at least part on performing the rate matching on the per-channel basis and after a transmission of the plurality of transport blocks on the plurality of channels, per-channel acknowledgment information associated with the plurality of channels; and
selectively adjust, prior to performing a listen before talk (LBT) procedure and based at least in part on the per-channel acknowledgment information, a plurality of contention windows, each associated with the LBT procedure to be performed on a respective one of the plurality of channels,
wherein, when a channel, of the plurality of channels, is punctured in association with transmitting the transmission of the plurality of transport blocks, a contention window, of the plurality of contention windows and associated with the channel, is selectively adjusted based at least in part on acknowledgement information associated with a subsequent transmission.

15. The non-transitory computer-readable medium of claim 14, wherein the transmission of the plurality of transport blocks is a physical downlink shared channel (PDSCH) transmission.

16. The non-transitory computer-readable medium of claim 14, wherein multiple grants, each associated with a respective one of the plurality of transport blocks, are provided to another wireless communication device.

17. The non-transitory computer-readable medium of claim 14, wherein a single grant, associated with each of the plurality of transport blocks, is provided to another wireless communication device.

18. An apparatus, comprising:
means for performing rate matching of coded bits of each transport block, of a plurality of transport blocks, on a per-channel basis of each of a plurality of channels in a wideband channel of an unlicensed spectrum,
wherein the rate matching is performed on the per-channel basis in a first set of slots of a transmission opportunity, and
wherein the rate matching of coded bits is performed such that coded bits of each transport block, of the plurality of transport blocks, are mapped to a respective one of the plurality of channels;
means for receiving, based at least part on performing the rate matching on the per-channel basis and after a transmission of the plurality of transport blocks on the plurality of channels, per-channel acknowledgment information associated with the plurality of channels; and means for selectively adjusting, prior to performing a listen before talk (LBT) procedure and based at least in part on the per-channel acknowledgment information, a plurality of contention windows, each associated with the LBT procedure to be performed on a respective one of the plurality of channels,
  wherein, when a channel, of the plurality of channels, is punctured in association with transmitting the transmission of the plurality of transport blocks, a contention window, of the plurality of contention windows and associated with the channel, is selectively adjusted based at least in part on acknowledgement information associated with a subsequent transmission.

19. The apparatus of claim 18, wherein at least one of:
the transmission of the plurality of transport blocks is a physical downlink shared channel (PDSCH) transmission, or multiple grants, each associated with a respective one of the plurality of transport blocks, are provided to another wireless communication device.

20. The apparatus of claim 18, wherein a single grant, associated with each of the plurality of transport blocks, is provided to another wireless communication device.

* * * * *